(12) United States Patent
Sarich et al.

(10) Patent No.: US 7,369,998 B2
(45) Date of Patent: May 6, 2008

(54) CONTEXT BASED LANGUAGE TRANSLATION DEVICES AND METHODS

(75) Inventors: Ace J. Sarich, Annapolis, MD (US); John T. Hall, Arnold, MD (US)

(73) Assignee: Voxtec International, Inc., Annaplois, MD (US)

( * ) Notice: Subject to any disclaimer, the term of this patent is extended or adjusted under 35 U.S.C. 154(b) by 886 days.

(21) Appl. No.: 10/640,572

(22) Filed: Aug. 14, 2003

(65) Prior Publication Data

US 2005/0038662 A1    Feb. 17, 2005

(51) Int. Cl.
*G06F 17/28* (2006.01)
*G10L 21/00* (2006.01)

(52) U.S. Cl. ......................................... 704/277; 704/3
(58) Field of Classification Search ................ 704/3, 704/277

See application file for complete search history.

(56) References Cited

U.S. PATENT DOCUMENTS

| | | |
|---|---|---|
| 4,130,882 A | 12/1978 | Swanstrom |
| 4,311,465 A | 1/1982 | Jacobs |
| D269,442 S | 6/1983 | Nakajima |
| 4,438,505 A | 3/1984 | Yanagiuchi |
| 4,509,137 A | 4/1985 | Yoshida |
| 4,551,818 A | 11/1985 | Sado |
| 4,593,356 A | 6/1986 | Hashimoto |
| 4,597,056 A | 6/1986 | Washizuka |
| 4,606,025 A | 8/1986 | Peters |
| 4,623,985 A | 11/1986 | Morimoto |
| 4,633,435 A | 12/1986 | Morimoto |
| 4,636,977 A | 1/1987 | Ikemoto |
| 4,644,492 A | 2/1987 | Murata |
| 4,648,070 A | 3/1987 | Washizuka |
| 4,688,189 A | 8/1987 | Hirata |
| 4,809,192 A | 2/1989 | Washizuka |
| 4,962,452 A | 10/1990 | Nogami |
| 4,984,177 A | 1/1991 | Rondel |
| 5,006,849 A | 4/1991 | Baarman |
| 5,023,786 A | 6/1991 | Kugimiya |
| D321,208 S | 10/1991 | Bergstresser, Sr. |
| 5,063,534 A | 11/1991 | Kishimoto |
| 5,073,054 A | 12/1991 | McDowell |

(Continued)

FOREIGN PATENT DOCUMENTS

EP    0 751 467 A2    1/1997

OTHER PUBLICATIONS http://www.baltimoresun.com/technology/bal-bz.phrase18may18,0,1869589.story?coll=bal-technology, printed May 18, 2004.

*Primary Examiner*—David Hudspeth
*Assistant Examiner*—Justin W. Rider
(74) *Attorney, Agent, or Firm*—Howrey LLP

(57) ABSTRACT

The invention includes devices and methods for providing phrase-based translation. Devices of the invention have translation modules containing a set of phrases and their translations wherein the set of phrases is selected based on their suitability in the context in which the translation device is used. The methods of the invention determine the context in which a translation device is used and provide sets of phrases and their translations that are suitable in the context. The invention further includes devices containing software for executing the methods of the invention.

33 Claims, 7 Drawing Sheets

U.S. PATENT DOCUMENTS

| | | |
|---|---|---|
| 5,101,424 A | 3/1992 | Clayton |
| D332,775 S | 1/1993 | Cavanaugh |
| 5,220,503 A | 6/1993 | Suzuki |
| 5,384,701 A * | 1/1995 | Stentiford et al. ............. 704/3 |
| D355,898 S | 2/1995 | Verderame |
| 5,583,761 A | 12/1996 | Chou |
| 5,594,638 A * | 1/1997 | Iliff ............................... 705/3 |
| 5,668,928 A * | 9/1997 | Groner ....................... 704/243 |
| 5,832,480 A * | 11/1998 | Byrd et al. .................... 707/5 |
| D410,228 S | 5/1999 | Jones |
| D415,154 S | 10/1999 | White |
| 5,974,372 A | 10/1999 | Barnes |
| 6,061,646 A * | 5/2000 | Martino et al. ................ 704/3 |
| 6,243,684 B1 * | 6/2001 | Stuart et al. ................ 704/275 |
| 6,397,185 B1 * | 5/2002 | Komissarchik et al. ..... 704/270 |
| 6,434,518 B1 * | 8/2002 | Glenn ........................... 704/3 |
| 6,438,524 B1 | 8/2002 | Shi |
| 2002/0111791 A1 * | 8/2002 | Candelore ...................... 704/7 |
| 2002/0184002 A1 * | 12/2002 | Galli ............................. 704/7 |
| 2003/0208352 A1 * | 11/2003 | Lee ............................... 704/2 |

* cited by examiner

CONTEXT BASED LANGUAGE TRANSLATION DEVICES AND METHODS

GOVERNMENT RIGHTS LEGEND

The invention was made with government support under government contract DAAH01-01-C-R003 awarded by DARPA via Army Aviation & Missile Command, Redstone Arsenal. The United States Government has certain rights in the invention.

FIELD OF THE INVENTION

This invention relates to electronic translation devices and methods for translating spoken words from one language into another language.

BACKGROUND OF THE INVENTION

People who want to communicate in languages they do not speak have several options. They can hire human interpreters who can speak and understand both the language of their employers (the source language) as well as the language their employers wish to communicate in (the target language). An interpreter listens to the speaker communicate a message in the source language, and then translates by communicating the message in the target language. This option suffers from several drawbacks: interpreters may be prohibitively expensive or otherwise unavailable, or may purposely translate inaccurately if their objectives are at odds with those of the speaker. Another option, popular with many tourists, is to use a translation phrasebook. This allows speakers to look up common words and phrases in their native language, and provides a phonetic translation of the phrase in the target language. However, this option suffers from the drawback that it takes a significant amount of time to look up a word or phrase, making for exceedingly slow communication.

The inadequacies of the above translation options have led to the development of electronic translation devices that provide nearly instantaneous translations. For example, U.S. Pat. No. 6,434,518, incorporated herein by reference, discusses an electronic translator that functions like an enhanced translation phrasebook. A user selects one of a number of predetermined words or phrases in a source language, the selected word or phrase is translated into a target language, and an audio output is provided to pronounce the selected word or phrase in the target language. While this solution may be faster than using a phrasebook, it is still slower than using a human interpreter because the word or phrase that is to be translated must still be found and selected from among many available words and phrases. Furthermore, the vocabulary may be limited where a broad vocabulary or a situation-specific vocabulary is needed.

European publication no. EP 751467, incorporated herein by reference, discusses an electronic translation device that functions more like a human interpreter. A user speaks a phrase in the user's native language, and the device provides an identical or similar phrase or sentence in the user's native language. If the phrase or sentence provided by the device is that intended by the user, the user can operate a control key and a corresponding phrase or sentence is output by the device in the target language. With other similar electronic translation device, a user can speak a phrase in the user's native language, and the translation device will repeat the phrase in the target language through an audio output. A match is made between the spoken native language phrase and similar native language phrases stored in the device if the spoken phrase and similar phrase are similar enough as measured by some predetermined standard. Such devices allow more rapid communication than an electronic or paper phrasebook translator, but unfortunately are not as reliable as might be desired. These devices cannot recognize the speech of an arbitrary user, and thus must be trained using speaker-dependent voice recognition techniques known in the art. Therefore, such a translation device may only be used by a single user who has trained the device.

There is thus a need in the art for fast and reliable translation methods and devices that need not be trained and yet accurately recognize spoken phrases in a source language and provide correct translations into a target language.

SUMMARY OF THE INVENTION

It is thus an object of the invention to provide fast and reliable translation devices and methods that need not be trained to recognize a user's voice, yet accurately recognize spoken phrases in a source language and provide correct translations into a target language.

In one aspect, the invention includes a method for providing a phrase vocabulary in an electronic translation device with a means for inputting a native language phrase and a means for outputting a translation of the phrase in a target language. The steps of the method may include: (a) evaluating a context in which the translation device will be used, (b) selecting a set of native language phrases that would be useful in the context, (c) providing translations of the native language phrases into a target language, (d) associating each native language phrase with the corresponding target language translation, the set of associated phrases and translations comprising a translation module, and (e) uploading the translation module onto the translation device; wherein the translation module is stored in a memory means of the translation device. The context in which the translation device will be used can be evaluated using methods described in the description of the invention section below. Contexts in which translation devices programmed with phrase libraries assembled using methods of the invention include, but are not limited to, hospitals and other medical settings, geriatric care, child care, tourism, and military situations, for example. The term 'context' should be construed to include more specific subcontexts as well, for example, contexts might include emergency medical care, cardiology, or internal medicine within the broad medical context, for example.

Translation devices of the invention include translation devices programmed with translation modules created using the methods of the invention. The translation devices include, but are not limited to, text-to-text translation devices, text-to-speech translation devices, speech-to-text translation devices, and speech-to-speech translation devices. In speech-to-text and speech-to-speech translation devices, the input phrase to be translated is spoken in the native language, and software loaded on the translation device recognizes the input speech and matches it to a set of native language phrases. Such translation devices may include memory means such as DRAM, SDRAM, flash RAM, CD-ROM, magnetic disks or tape, or any other such device for storing electronic information. In one aspect, the translation device may employ speaker independent voice recognition as the means for inputting phrases from the set of phrases that are translated by the translation device. The translation device may employ audio output of the translation through a speaker as the means for outputting a translation of the phrase in the target language, and the step of providing translations of the phrases in the set of phrases may be done by recording a spoken translation of the phrase. The gender and tone of the spoken translation of the phrase may be selected based on the context.

In one aspect, the method may comprise adding alias phrases to the set of phrases, wherein each alias phrase has a similar meaning to a similar phrase in the set of phrases and is associated with the translation corresponding to the similar phrase. The method may further comprise the step of deconflicting the selected set of phrases by determining whether pairs of phrases in the set of phrases are too similar sounding and eliminating one of the phrases in each pair of phrases that are too similar sounding. This step may be performed using any method known in the art of comparing the similarity of sounds, particularly of spoken words or phrases. A threshold level of similarity may be set beyond which the likelihood of one phrase being mistaken for another by the speech recognizer exceeds tolerable standards for accuracy of speech recognition. The method may further comprise the step of replacing a phrase that was eliminated from a pair of phrases that were too similar sounding.

In another aspect, the method may comprise sorting phrases in the selected set of phrases or in the translation module into categories of phrases, wherein every phrase in a category is related to the same subject. The method may comprise the step of associating tag words with each phrase in the selected set of phrases or in the translation module, wherein the tag words associated with each phrase are related to the same subject as the associated phrase. The translation device may allow searching for translatable phrases, that is phrases that are part of the translation module uploaded onto the translation device, by indicating a tag word, and the translation device may provide all phrases associated with the tag word. In one aspect of the invention, the translation device may recognize a spoken tag word (or a tag word otherwise inputted) and provide a list of translatable phrases associated with the spoken tag word.

The invention includes devices including any computer, translation device, handheld PDA, magnetic tape or disk, CD-ROM, DRAM, SDRAM, or any other device capable of storing electronic information that stores or executes a software program, wherein the software program builds translation modules by executing a method comprising the steps of (a) receiving input comprising a set of native language input phrases, (b) deconflicting the phrase set by determining whether pairs of phrases in the set of native language input phrases are too similar sounding and eliminating one of the phrases in each pair of phrases that are too similar sounding, and (c) receiving input comprising a set of corresponding target language phrase translations, wherein each member of the set of native language input phrases has a corresponding target language phrase, (d) compiling the phrase set and corresponding target language phrase translations into a translation module accessible by the translation software on a translation device, and (e) uploading the translation module into the memory of a translation device. In one aspect, the corresponding target language phrase translations are recorded spoken translations of the native language input phrases in the target language. The gender and tone of the spoken translations of the phrases may be selected based on the context.

The software program may further execute the step of receiving input comprising alias phrases, wherein each alias phrase has a similar meaning to a similar phrase in the set of native language input phrases and is associated with the translation corresponding to the similar phrase. The software program may further execute the step of receiving input comprising a native language phrase with the same meaning as a native language phrase that was eliminated from a pair of phrases that were too similar sounding. The software program may further execute the step of sorting phrases in the set of native language input phrases or in the translation module into categories of phrases, wherein every phrase in a category is related to the same subject. The software program may further execute the step of associating tag words with each phrase in the set of native language input phrases or in the translation module, wherein the tag words associated with each phrase are related to the same subject as the associated phrase. In one aspect, phrases in the translation module are accessible by speaking associated tag words, and the translation device provides a list of phrases associated with a spoken tag word.

BRIEF DESCRIPTIONS OF THE DRAWINGS

DETAILED DESCRIPTION OF THE INVENTION

Figure 1:
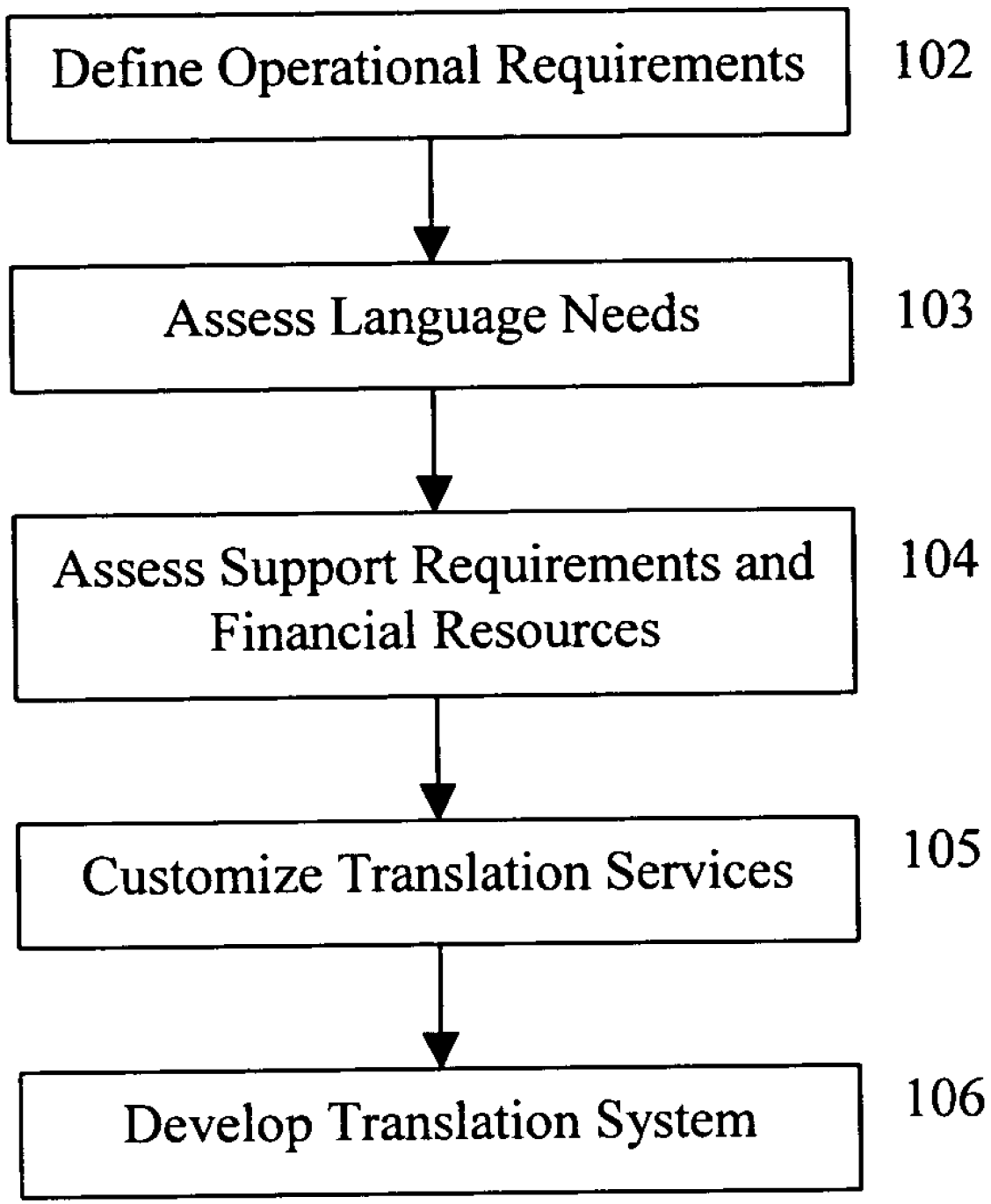
FIG. 1 is a flow diagram illustrating the main steps of an embodiment of a method of the invention for developing a translation system for an organization in need of translation services.

The devices and methods of the invention use speech recognition technology to determine what speakers intend to communicate by analyzing the sounds of words spoken in their native languages, and then translate and pronounce the intended communication in the desired foreign language. There are various approaches to speech recognition. These approaches can be broken into two broad categories: speaker independent speech recognition and speaker dependent speech recognition. In speaker dependent speech recognition, the speech recognition device must be "trained" to recognize a particular speaker's speech. After training, the speech recognition device can fairly reliably recognize words spoken by the speaker who trained it, but typically has difficulty reconstructing words spoken by any other speaker. One of the benefits of speaker dependent speech recognition is that most words or combination of words can be recognized when spoken by the speaker who trained the speech recognition device. An obvious drawback, however, is that the device requires training, and can only be used by one speaker.

The alternative speaker independent speech recognition is more limited in certain ways, but can be much more versatile in others. Because speaker independent speech recognition should work with almost any speaker, it is generally not as reliable at recognizing words. Two different speakers may pronounce a word differently enough that it would be impossible for the device to determine that they were speaking the same word. However, this limitation can be overcome by limiting the vocabulary that can be recognized, eliminating one of two words that sound alike and might cause confusion. If speakers are aware that the vocabulary of a speech recognition device is limited, they can deliberately use only the words that the device can understand.

Extending this principle, the inventors have found a way to optimize the selection of words, phrases, and sentences to be incorporated into a translation device that balances the needs for a large and flexible vocabulary and for a set of words, phrases, and sentences whose members would not be confused with other members of the set. The methods of the invention are beneficially employed with speaker independent speech recognition translation because they can provide a limited yet flexible phrase vocabulary. The limited number of phrases can be targeted to the specific translation needs of an individual or group. The phrase vocabularies constructed using the present invention are unlimited in principle, because the potential for adding to or changing a phrase vocabulary is always available; the content of the translation devices of the invention is customizable, and additions can be made as needed. A relatively small phrase vocabulary in a single translation device improves speech recognition because there are fewer phrases available that could be confused with other phrases. The methods are also beneficially employed with any form of speech recognition or text-based translation, as set forth herein, because they improve the accuracy of speech recognition and optimize memory usage in electronic translation devices. The methods may be used to provide translation systems to any organization with translation needs, including businesses, government agencies, travel groups, and individuals.

Figure 2:
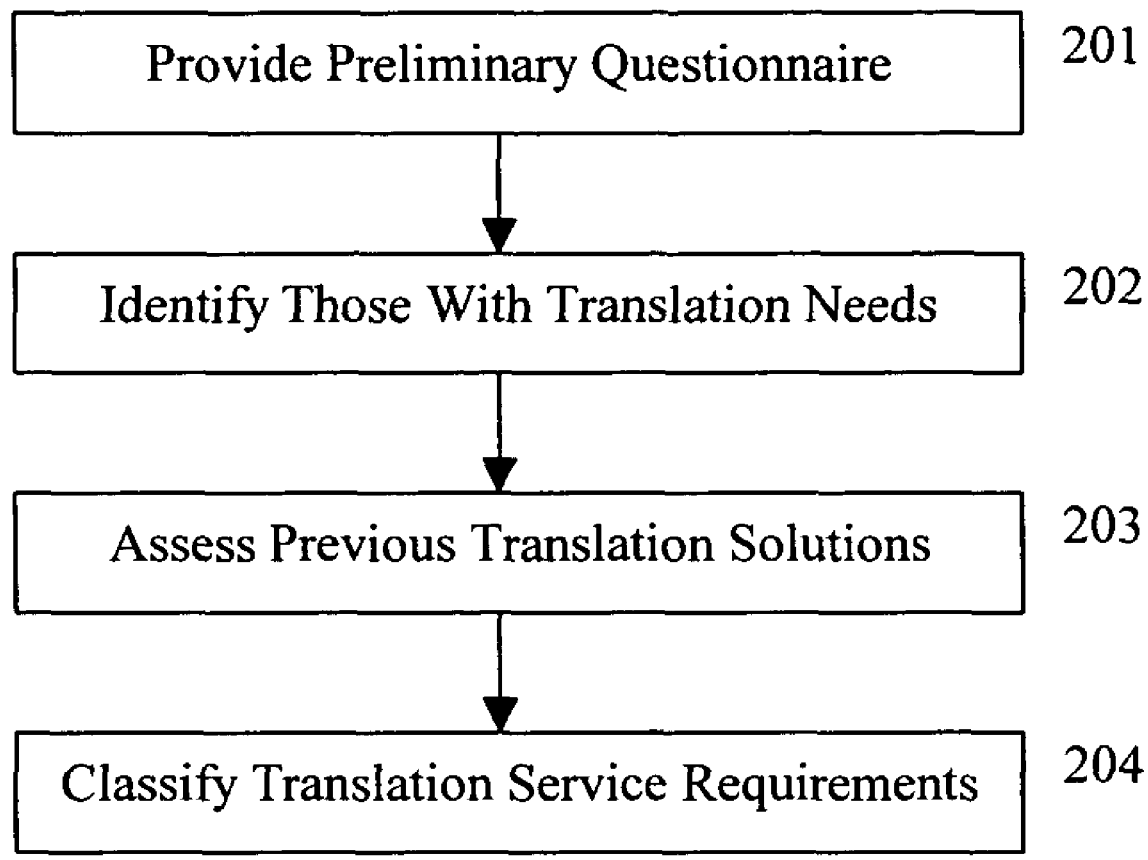
FIG. 2 is a flow diagram illustrating the steps that may be involved in defining the requirements of the organization.
Figure 3:
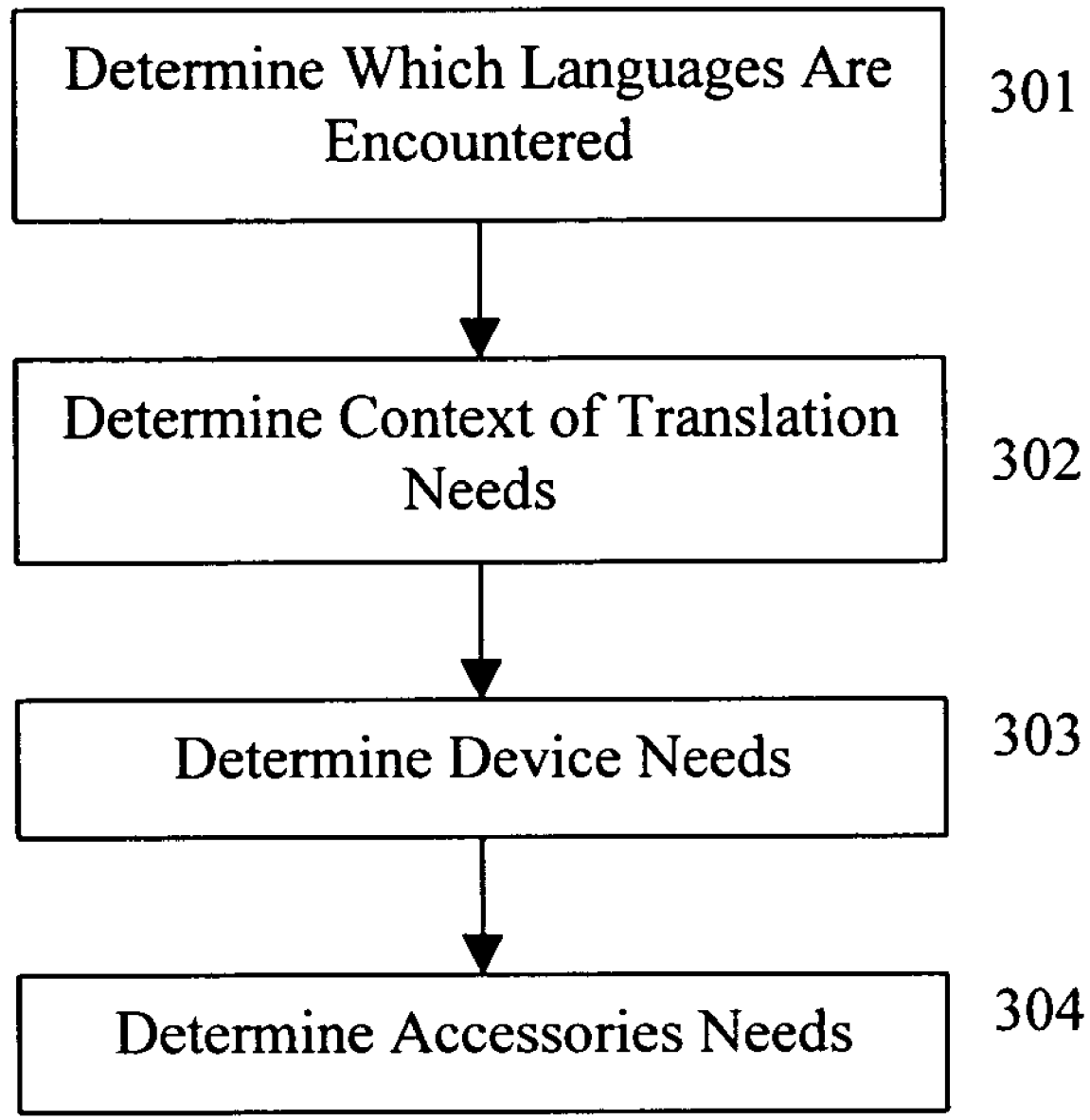
FIG. 3 is a flow diagram illustrating the steps that may be involved in assessing the language and device requirements for the translation system.
Figure 4:
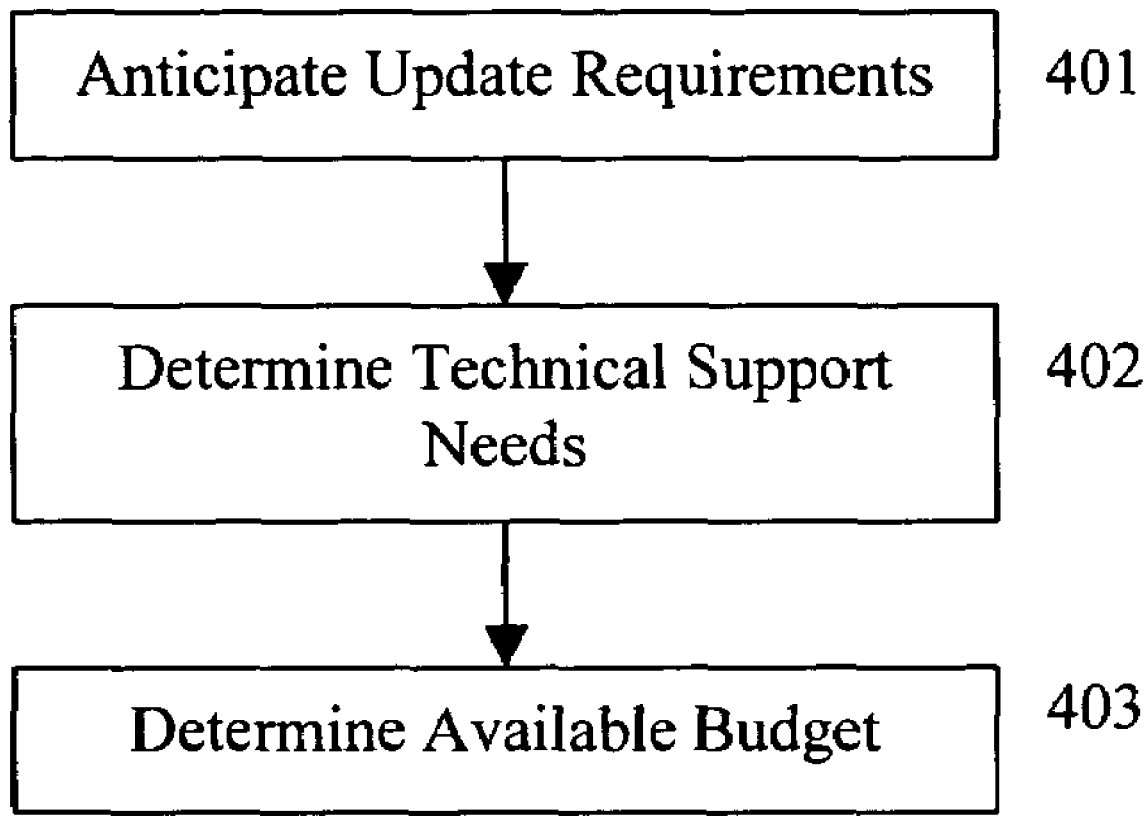
FIG. 4 is a flow diagram illustrating the steps that may be involved in assessing the product support and financial requirements for the translation system.
Figure 5:
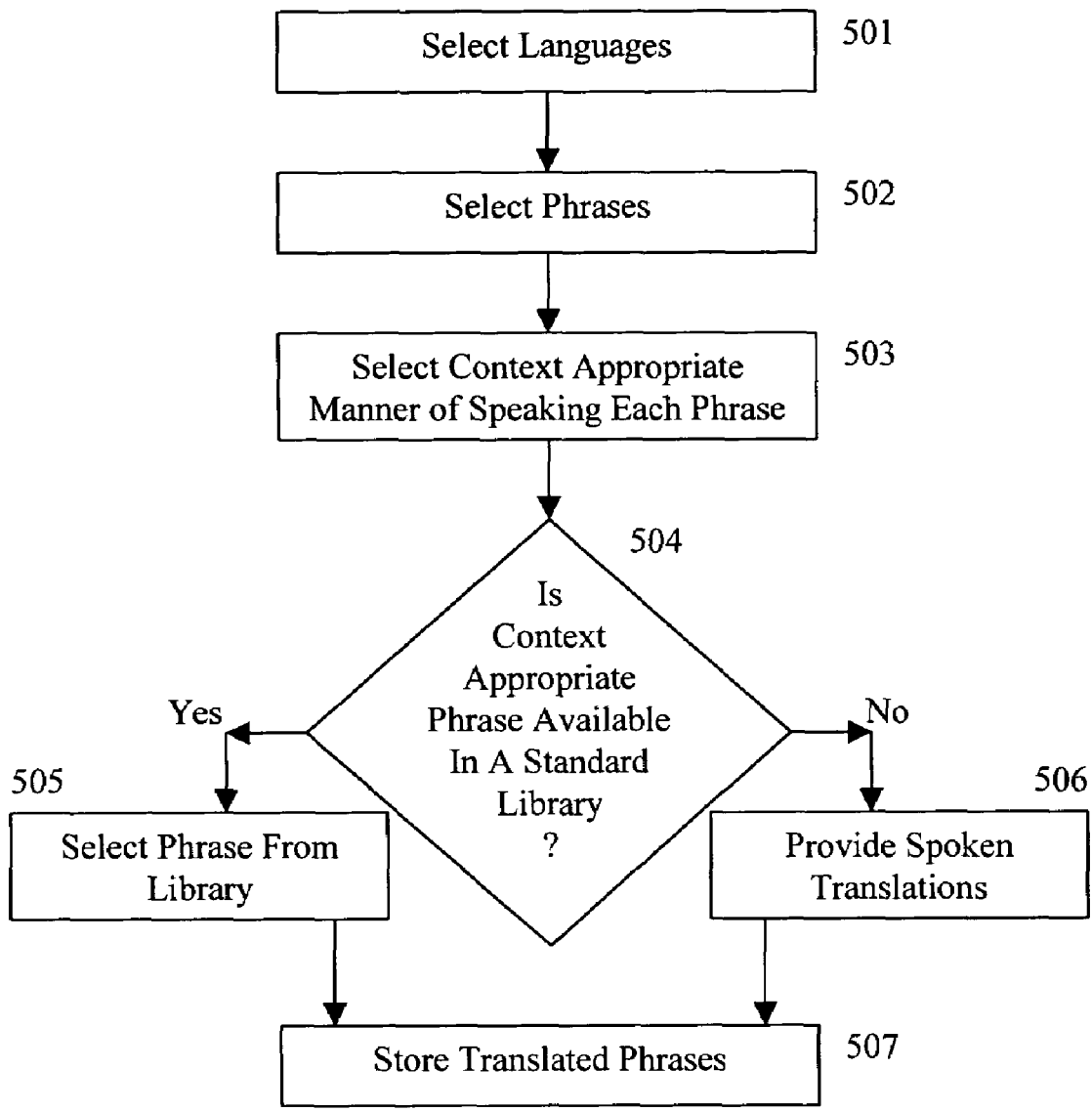
FIG. 5 is a flow diagram illustrating the steps that may be involved in customizing translation system.
Figure 6:
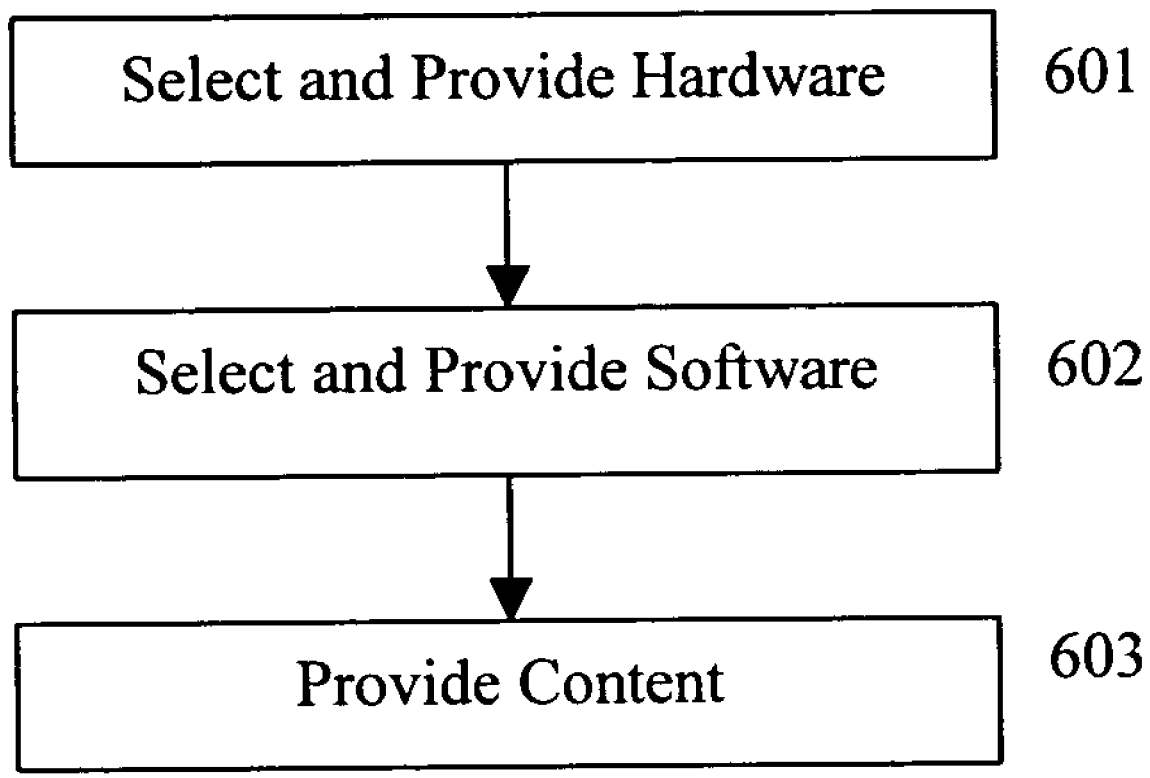
FIG. 6 is a flow diagram illustrating the steps that may be involved in developing and providing the translation system.

FIG. 1 outlines several main steps that may be used in methods of the invention to develop reliable and optimally useful translation systems. Unless explicitly specified otherwise, all steps recited in the exemplary methods and figures described herein are optional and may be performed in any combination in any order, with the preferred order being that recited. Step 102 defines the requirements of an operation in general terms in order to outline the scope of the translation needs. FIG. 2 provides details of step 102. Step 103 refines the requirements by assessing specific language needs. FIG. 3 provides details of step 103. Step 104 assesses support requirements for physical systems upkeep and upgrades, personal technical support, and content upgrades, for example. Step 104 further assesses the financial resources required to provide the translation services recommended based on the operational requirements determined in the previous steps, and may modify recommendations based on available finances. FIG. 4 provides details of step 104. Step 105 customizes the translation services based on determinations of previous steps. FIG. 5 provides details of step 105. Step 106 develops translation systems from the results of previous steps. FIG. 6 provides details of step 106.

FIG. 2 provides some details of an embodiment of step 102, which defines the general requirements of an operation. Step 201 provides a preliminary questionnaire to an organization with translation needs. The organization can be any group, business, government agency, or even individuals with translation needs. The preliminary questionnaire can be in any format, for example, it can be written, electronic, or spoken in a personal interview. The preliminary questionnaire can be used to determine which members of the organization encounter situations demanding translation services, as requested in step 202. In step 203, the preliminary questionnaire can be used to evaluate how previous translation solutions implemented by an organization might be improved upon in developing a new translation solution for the organization. In one aspect of the invention, translation services can be classified into different types, wherein each type of translation service type corresponds to a specific vocabulary or portion thereof. For example, types of translation services may include repetitive and structured commands, instructive or teaching, diagnostic, and administrative. In step 204, the preliminary questionnaire can be used to determine the type of translation services best suited for each member of the organization with translation needs.

FIG. 3 provides some details of an embodiment of step 103, which more particularly assesses translation needs of individuals in an organization. Step 301 determines which languages and dialects are encountered by each individual in order to determine which target languages will be necessary to provide with the translation system. Step 302 determines the context in which translation will be used. For example, the context would include translation type as determined in step 204 described above, as well as other contextual information including the reason for the situation requiring translation, cultural details of the target audience, gender of the target audience, and educational level of the target audience. Step 303 determines the device needs of each individual, for example, whether the translation device should be portable or whether a fixed device would be acceptable, or whether the device should be made more rugged to withstand harsher conditions. Examples of platforms that may be used with the invention include, but are not limited to, standard and ruggedized mobile devices, pocket PCs, desktop PCs, and client-server systems. Step 304 determines the need for any accessories, including, for example, point-to sheets with universally recognizable symbols and pictures to aid in communication, and target language response forms, facilitating written communication.

FIG. 4 provides some details of an embodiment of step 104, which assesses support requirements and financial resources for the translation system. Step 401 assesses future update requirements. For example, if a business is successful in one foreign market, it may plan to expand into other foreign markets, and thus it may have needs for new language support in its translation system. Or a business may anticipate expanding needs for its translation system within a single foreign market if that market grows or if there are multiple languages within that market, thus requiring additional translation devices. Future software upgrades that may be directly related or unrelated to the translation system itself may be required. To the extent that these future upgrades and updates can be estimated, they will aid in calculating the immediate and future costs of the translation system. Step 402 determines the technical support needs for the translation system. The cost of technical support generally scales with the size and complexity of the translation system, and can be estimated using known methods. Step 403 determines the available budget for the translation system.

The available budget as determined in step 403 may place constraints on the size of the system, the number of translation devices that can be purchased or leased, the number of custom languages and phrases that can be provided, and the technical and upgrade support that can be provided. Thus these factors are preferably adjusted in view of the available budget to provide optimal translation services to fit the needs as determined in the previous steps when customizing the services in step 105 (see FIG. 5) and developing the translation system in step 106 (see FIG. 6).

FIG. 5 provides some details of an embodiment of step 105, which customizes the translations services based on needs assessed in the previously described steps. Step 501 selects languages to be translated based on which languages an organization needs translated, as determined in step 301. Step 502 selects particular words and phrases that would be needed in the context of the situations encountered by those using the translation system as determined in step 302. For each customizable phrase selected in step 502, the appropriate manner of speaking the phrase is selected in step 503. The appropriate manner of speaking includes the tone of the phrase to be spoken in the target language and the gender of the speaker of the phrase in the target language based on cultural and situational considerations, and may consider such contextual information as whether a phrase should be spoken formally or informally, commanding or solicitous, or urgent or calming, for example. A customizable phrase may be one that is provided specifically for the particular organization requiring translation services, and may be required to be translated and spoken in the target language by a native or fluent speaker of the target language to be recorded for inclusion in the customized phrase vocabulary.

In one embodiment of the invention, a number of common phrases in a number of different languages for a number of different contexts would be available in standard libraries of contextual phrases. The phrases in these standard libraries may include versions spoken by men and other versions spoken by women, in case a particular gender is preferred in a particular context. The standard libraries may also include versions of phrases spoken with different tones of voice appropriate to context. The phrases in such standard libraries would thus be customizable to the extent that one of multiple versions of the phrase can be selected. Thus for each phrase selected for inclusion in step 502, in addition to determining how and by whom the phrase should be spoken in step 503, a determination is made whether a phrase from a standard library may be used in step 504. If so, then step 505 selects the phrase from the standard library. If not, then a native or fluent gender-appropriate speaker of the target language may be hired to record the phrase in the context-appropriate tone in step 506.

In step 507, the complete set of translated recorded phrases customized for a particular organization may be collected and stored in a storage device at least until they can be transferred to the customizable translation devices provided with the translation system. At this point, subsets of the complete set of translated recorded phrases customized for the organization may be grouped together to correspond to the desired content of each of the translation devices to be provided with the translation system. For example, one individual within the organization may need a translation device that translates medical diagnostic questions into a target language, while another individual may need a translation device that translates administrative terminology into the target language. Since in general the sets of phrases required by each of these individuals will differ because of the differing contexts in which they will need translation services, the sets of phrases provided with each of their translation devices should reflect those differences.

FIG. 6 provides some details of an embodiment of step 106. Step 601 assesses the hardware, selects the hardware that optimally satisfies those requirements, and provides the selected hardware to the organization requiring translation. The step of assessing the hardware requirements can benefit by considering the device and accessories needs as determined in steps 303 and 304, and further hardware needs such as server systems, networks, and other infrastructure that might be required to satisfy an organization's translation needs. The step of selecting the hardware that optimally satisfies the hardware requirements preferably benefits from considering the available budget, as determined in step 403.

Step 602 assesses the organization's software requirements, selects the software that optimally satisfies those requirements, and provides the selected software to the organization. The software that is provided may include, for example, operating system software for handheld, desktop, and server systems, translation software, and module builder software. Module builder (MB) software allows customization of translation devices by an organization or by the translation system developer.

MB software may be used in several of the previous steps, including the phrase selection process, step 502, it may be interfaced with the phrase library and thus be useful in steps 504 and 505, it may be used in step 506 to digitally (or otherwise) record translations, it may be used to store translations in step 507, and it may be used to provide content in step 603. MB software allows selection of phrases in the native language, preferably based on the translation goals and language needs information gathered in steps 102 and 103, although the selection of phrases can often be improved by interviewing or requesting a list of phrases from the individuals that have experience communicating in the particular contexts determined in step 302. MB software further allows the option of obtaining translations of the native language phrases from a pre-existing library of translations and may offer gender and manner of speaking customization options if they are available.

One preferred use of MB software is to build translation modules. A translation module is a discrete set of words and phrases that may be classified together because they are useful for communicating in the same context. The inventors have found that organizing translation capacity into one or more translation modules improves performance of translation devices, particularly of translation devices that use speech recognition for input of the native language phrases, because it limits the number of phrases in a group of translatable phrases. Even in text-based input, the appropriate native language phrase is easier and quicker to find if it is among fewer translatable phrases.

MB software may also be used to associate category designations with particular phrases, thus potentially further limiting the number of phrases in a group. For example, a translation module might include a set of phrases that are useful in a broadly defined medical context. Categories within that translation module might include general medical phrases, emergency medicine, internal medicine, oncology, radiology, and hospital administration, for example. Or a translation module might include a set of phrases that are useful in a more narrowly defined medical context, such as radiology. Categories within that translation module might include radiological specialties such as an X-Ray category and an MRI category, for example. In translation devices that implement speaker independent speech recognition, limiting the group of translatable phrases on the basis of category can improve recognition capability and thus reliability of translation. Users may select the category that contains the phrase they want translated then speak the desired phrase, and the speech recognition engine need only attempt to match the spoken phrase to a phrase within the category. Alternatively, categories are useful apart from speaker-independent speech recognition because they can facilitate searching for translatable phrases. Descriptive tags may be associated with phrases to refine subgroups within or among the categories to simplify searching for translatable phrases. Descriptive tags may refer to all phrases containing the particular tag word or to all phrases with meanings related to the tag word, for example; the association of tags with phrases can be done however would best facilitate finding the phrases.

Figure 7:
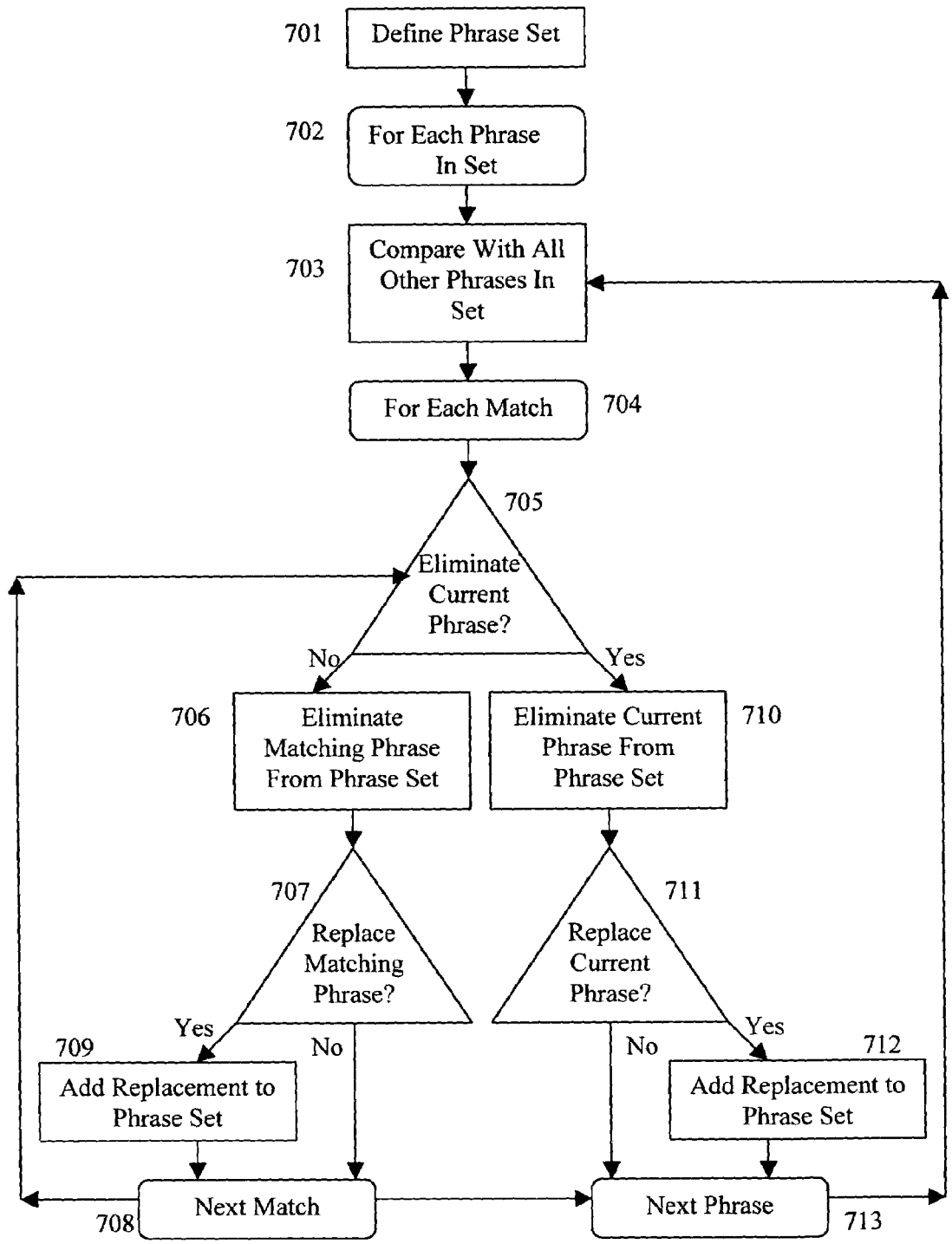
FIG. 7 is a flow diagram illustrating a deconflicting method that may be used in the methods of the invention.

While limiting the number of translatable phrases by module and/or category is one way to improve the reliability of translation devices using speaker-independent speech recognition for input, deconflicting input phrases can also improve reliability without significantly sacrificing a large phrase vocabulary. MB software may be used for deconflicting. An example of the deconflicting method is shown in FIG. 7. Step 701 selects an initial set of phrases as a set of translatable phrases (including alias phrases as described below). Whether as a module or a category or any other unit, in a loop 702 over each phrase in the set, each phrase is compared with every other phrase in the set in step 703 on the basis of pronunciation using any known comparison method. Pairs of phrases that are too similar in pronunciation are noted as matches, with the matching phrase being the phrase in the set found to be similar to the current phrase in the loop over all the phrases in the set.

A subloop 704 over each matching phrase is run in which a determination is made 705 whether to eliminate the current phrase or the matching phrase. If the matching phrase is chosen to be eliminated, then it is removed from the phrase set in step 706. Step 707 determines whether a replacement phrase for the eliminated matching phrase should be added to the phrase set. If not, the loop over matching phrases continues with the next match at step 708. If step 707 determines that a replacement phrase for the eliminated matching phrase should be added, then in step 709 the replacement phrase is added to the set of phrases, preferably such that the replacement phrase will be compared with all other phrases in the set in step 703. The loop over matching phrases then continues with the next match at step 708. The subloop 704 over each matching phrase is terminated when either step 705 determines that the current phrase should be eliminated or when the loop over the matches is complete, in which case the match loop 708 returns to the phrase set loop at 713 with the next phrase.

If step 705 determines that the current phrase rather than the matching phrase should be eliminated, then the current phrase may be removed from the set of phrases in step 710. Step 711 determines whether the eliminated current phrase should be replaced. If not, the phrase loop continues at 713 with the next phrase. If step 711 determines that the eliminated current phrase should be replaced, then step 712 adds the replacement phrase to the phrase set, preferably such that the replacement phrase will be compared with all other phrases in the set in step 703.

A useful feature of the methods of the invention is that they allow alias phrases to be provided in the native language. MB software may be used to provide alias phrases. Preferably, an alias phrase has a meaning that is the same as or similar to the meaning of an original phrase in a set of phrases, and is associated with the same target language translation as the original phrase. Alias phrases can expand the number of ways a particular target language translation of the original phrase can be accessed in the native language, which in turn makes the translation device more accessible to novice users who are unfamiliar with the phrase set. Alias phrases are preferably added to the phrase set before any deconflicting step, to ensure that the alias phrases are not likely to be confused with each other or any of the phrases in the set.

MB software is preferably capable of compiling translation modules into phrase libraries accessible to the translation software running on a translation device. MB software is further preferably capable of controlling the uploading of compiled translation modules onto translation devices over networks, through serial ports, or by any other means of connecting electronic devices for data transfer. The uploaded translation modules may be stored on handheld translation devices in removable memory such as flash memory, for example. Uploaded translation modules may be stored on desktop computer translation systems on hard drives or CD ROM, for example.

Translation devices using translation modules of the invention preferably have voice command and voice search features to facilitate their use. For example, voice searches may proceed by allowing users to speak search terms, and providing lists of phrases that match those search terms, for example, on the basis of the names of categories or tag words associated with the returned phrases. A textual display or other means for outputting the search results allow users to select the phrases that they were searching for. Users may then speak the phrases in the native language as usual and the translation device provides the translation into the target language. If the functionality of voice commands and voice input of phrases to be translated is desired, then the translation device should have a microphone and related circuitry for capturing and digitizing the voice input. If the functionality of an audio output is desired, then an audio out jack or internal speaker and associated circuitry for D/A conversion and amplification should be incorporated in the translation device.

Each reference cited above is incorporated herein in its entirety. While the preceding sections describe several embodiments, they are not meant to limit the scope of the invention in any way. It will be apparent to those skilled in the art that various modifications and variations can be made in the devices and methods of the invention without departing from their spirit and scope. The following claims are intended to cover modifications and variations of the invention that are within the scope of these claims and their equivalents.

We claim:

1. A method for providing a phrase vocabulary in an electronic translation device with a means for inputting a native language phrase and a means for outputting a translation of the phrase in a target language, the method comprising:
   (a) evaluating a context in which the translation device will be used,
   (b) selecting a set of native language phrases that would be useful in the context,
   (c) providing translations of the native language phrases into a target language,
   (d) associating each native language phrase with the corresponding target language translation, the set of associated phrases and translations comprising a customized translation module,
   (e) uploading the customized translation module onto the translation device, wherein the customized translation module is stored in a memory means of the translation device, and
   (f) deconflicting the selected set of phrases by comparing pairs of phrases in the set of phrases, determining whether the audio similarity of pairs of phrases in the set of phrases exceeds a predetermined threshold level of audio similarity, and eliminating one of the phrases in each pair of phrases that exceeds the predetermined threshold level of audio similarity;

wherein the translation device employs speaker independent voice recognition as the means for inputting phrases from the set of phrases that are translated by the translation device.

2. The method of claim 1, wherein the translation device employs audio output of the associated translation as the means for outputting a translation of the phrase in the target language, and the step of providing translations comprises the step of recording a spoken translation of the phrase.

3. The method of claim 2, further comprising the step of selecting the gender and tone of the spoken translation of the phrase based on the context.

4. The method of claim 1, further comprising adding alias phrases to the set of phrases, wherein each alias phrase has a similar meaning to a similar phrase in the set of phrases and is associated with the translation corresponding to the similar phrase.

5. The method of claim 1, wherein the electronic translation device is a handheld electronic translation device.

6. The method of claim 1, further comprising the step of replacing a phrase that was eliminated from a pair of phrases that exceeds the predetermined threshold level of audio similarity.

7. The method of claim 1, further comprising the step of sorting phrases in the selected set of phrases or in the translation module into categories of phrases, wherein every phrase in a category is related to the same subject.

8. The method of claim 7, further comprising the steps of selecting a category of phrases on the electronic translation device, listing the phrases in the selected category of phrases, and selecting a phrase from the list of phrases in the selected category of phrases.

9. The method of claim 8, wherein the step of selecting a phrase from the list of phrases in the selected category of phrases comprises speaking the selected phrase.

10. The method of claim 1, further comprising the step of associating tag words with each phrase in the selected set of phrases or in the translation module, wherein the tag words associated with each phrase are related to the same subject as the associated phrase.

11. The method of claim 10, further comprising selecting a tag word, listing the phrases associated with the tag word, and selecting a phrase associated with the tag word.

12. The method of claim 11, wherein the step of selecting a tag word comprises the step of speaking the tag word.

13. The method of claim 1, wherein the context is selected from the group consisting of medical care, geriatric care, child care, tourism, and military operations.

14. An electronic translation device comprising:
  (a) a means for inputting a native language input phrase,
  (b) a means for outputting a translation of the native language input phrase in a target language, and
  (c) a data storage device for storing a customized translation module containing the native language input phrase and the target language translation;

wherein the customized translation module is generated by a method comprising the steps of evaluating a context in which the translation device will be used, selecting a set of phrases including the native language input phrase, the selected set of phrases being useful in the context, providing translations of the phrases into the target language, providing a customized translation module by associating each native language phrase with the corresponding target language translation, and uploading the customized translation module into a memory of the translation device;

wherein the translation device employs speaker independent voice recognition as the means for inputting phrases from the set of phrases that are translated by the translation device; and wherein the selected set of phrases is deconflicted by comparing pairs of phrases in the set of phrases, determining whether the audio similarity of pairs of phrases in the set of phrases exceeds a predetermined threshold level of audio similarity, and eliminating one of the phrases in each pair of phrases that exceeds the predetermined threshold level of audio similarity.

15. The translation device of claim 14, wherein the translation device employs audio output of the translation through a speaker as the means for outputting a translation of the phrase in the target language, and providing translations of the phrases in the set of phrases is done by recording a spoken translation of the phrase.

16. The translation device of claim 15, wherein the gender and tone of the spoken translation of the phrase are selected based on the context.

17. The translation device of claim 14, wherein alias phrases are added to the set of phrases in generating the translation module, wherein each alias phrase has a similar meaning to a similar phrase in the set of phrases and is associated with the translation corresponding to the similar phrase.

18. The translation device of claim 14, wherein a phrase that was eliminated from a pair of phrases that exceeds the predetermined threshold level of audio similarity is replaced with a different phrase.

19. The translation device of claim 14, wherein phrases in the selected set of phrases or in the translation module are sorted into categories of phrases and every phrase in a category is related to the same subject.

20. The translation device of claim 19, wherein selecting a category on the translation device causes the translation device to list the phrases in the selected category.

21. The translation device of claim 14, wherein tag words are associated with each phrase in the selected set of phrases or in the translation module and the tag words associated with each phrase are related to the same subject as the associated phrase.

22. The translation device of claim 21, wherein selecting a tag word on the translation device causes the translation device to list the phrases associated with the selected tag word.

23. The translation device of claim 22, wherein phrases in the translation module are accessible by speaking associated tag words, and the translation device provides a list of phrases associated with a spoken tag word.

24. The translation device of claim 14, wherein the context is selected from the group consisting of medical care, geriatric care, child care, tourism, and military operations.

25. A device that stores or executes a software program, the device comprising:
  a memory, the memory being stored with processor-readable software code configured to enable the device to build customized translation modules; and
  a processor, the processor being configured to execute a method for building customized translation modules, the method comprising the steps of:
  (a) receiving input comprising a set of native language input phrases, (b) deconflicting the phrase set by comparing pairs of phrases in the set of phrases, determining whether the audio similarity of pairs of phrases in the set of phrases exceeds a predetermined threshold level of audio similarity, and eliminating one of the phrases in each pair of phrases that exceeds the predetermined threshold level of audio similarity, (c) receiving input comprising a set of corresponding target language phrase translations, wherein each member of the set of native language input phrases has a corresponding target language phrase, (d) compiling the phrase set and corresponding target language phrase translations into a customized translation module accessible by translation software on a translation device, and (e) uploading the customized translation module into the memory of a translation device.

26. The device of claim 25, wherein the corresponding target language phrase translations are recorded spoken translations of the native language input phrases in the target language.

27. The device of claim 26, wherein the gender and tone of the spoken translations of the phrases are selected based on the context.

28. The device of claim 26, wherein the software program further executes the step of receiving input comprising alias phrases, wherein each alias phrase has a similar meaning to a similar phrase in the set of native language input phrases and is associated with the translation corresponding to the similar phrase.

29. The device of claim 25, wherein the software program further executes the step of receiving input comprising a native language phrase with the same meaning as a native language phrase that was eliminated from a pair of phrases that exceeds the predetermined threshold level of audio similarity.

30. The device of claim 25, wherein the software program further executes the step of sorting phrases in the set of native language input phrases or in the translation module into categories of phrases, wherein every phrase in a category is related to the same subject.

31. The device of claim 25, wherein the software program further executes the step of associating tag words with each phrase in the set of native language input phrases or in the translation module, wherein the tag words associated with each phrase are related to the same subject as the associated phrase.

32. The device of claim 31, wherein phrases in the translation module are accessible by selecting associated tag words, and the translation device provides a list of phrases associated with a selected tag word.

33. The device of claim 32, wherein the step of selecting associated tag words comprises speaking the associated tag words.

* * * * *